United States Patent
Kwon et al.

(10) Patent No.: US 8,135,076 B2
(45) Date of Patent: Mar. 13, 2012

(54) ERROR CONCEALMENT APPARATUS AND METHOD

(75) Inventors: Nyeong-kyu Kwon, Daejeon Metropolitan (KR); Kwang-yuel Ryu, Suwon-si (KR); Min-kyu Park, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1423 days.

(21) Appl. No.: 11/341,608

(22) Filed: Jan. 30, 2006

(65) Prior Publication Data

US 2006/0171475 A1 Aug. 3, 2006

(30) Foreign Application Priority Data

Feb. 2, 2005 (KR) .................. 10-2005-0009597

(51) Int. Cl.
*H04N 7/12* (2006.01)
(52) U.S. Cl. .................................. 375/240.27
(58) Field of Classification Search ............ 375/240.01, 375/240.27, 240.16; 714/776
See application file for complete search history.

(56) References Cited

U.S. PATENT DOCUMENTS

| | | | |
|---|---|---|---|
| 4,656,514 A | 4/1987 | Wilkinson et al. | |
| 4,807,033 A | 2/1989 | Keesen et al. | |
| 5,410,553 A | 4/1995 | Choon | |
| 6,636,565 B1* | 10/2003 | Kim | 375/240.27 |
| 7,260,150 B2* | 8/2007 | Katsavounidis et al. | 375/240.28 |
| 2004/0244032 A1 | 12/2004 | Yamada | |
| 2005/0138532 A1 | 6/2005 | Park | |
| 2005/0144541 A1* | 6/2005 | Homm et al. | 714/48 |
| 2006/0104365 A1* | 5/2006 | Li et al. | 375/240.27 |
| 2006/0104366 A1* | 5/2006 | Huang et al. | 375/240.27 |

FOREIGN PATENT DOCUMENTS

| | | |
|---|---|---|
| EP | 1361759 A | 11/2003 |
| JP | 11-112939 A | 4/1999 |
| JP | 2002-529978 A | 9/2002 |
| KR | 10-1995-0026279 A | 9/1995 |
| KR | 10-2000-0050599 A | 8/2000 |
| KR | 10-2004-0089997 A | 10/2004 |
| WO | 2004/081744 A | 9/2004 |

* cited by examiner

*Primary Examiner* — Jaison Joseph
(74) *Attorney, Agent, or Firm* — Sughrue Mion, PLLC

(57) ABSTRACT

An error concealment apparatus and method that can selectively use error concealment techniques according to an error occurrence rate is disclosed. The error concealment apparatus includes an error detection unit for detecting errors occurring in video frames, first and second error concealment units for concealing the detected errors, and a video output unit for selectively outputting the video frames of which the errors have been concealed by the first and second error concealment units according to the results of error detection.

14 Claims, 7 Drawing Sheets

ERROR CONCEALMENT APPARATUS AND METHOD

CROSS-REFERENCE TO RELATED APPLICATION

This application claims priority from Korean Patent Application No. 10-2005-0009597 filed on Feb. 2, 2005 in the Korean Intellectual Property Office, the disclosure of which is incorporated herein by reference in its entirety.

BACKGROUND OF THE INVENTION

1. Field of the Invention

Apparatuses and methods consistent with the present invention relate to an error concealment, and more particularly to error concealment that can selectively use error concealment techniques according to an error occurrence rate.

2. Description of the Prior Art

Recently, with the development of digital signal processing technology, a technique for compressing and transmitting a larger amount of moving image information through a transmission channel of a limited bandwidth has also been developed.

In the moving image standards such as MPEG, H.261 and H.263, a slice is adopted as a re-synchronization unit for a channel error process.

The slice is composed of many macro blocks, and a macro block has a size of 16×16 pixels, which is a unit for a motion compensation coding. Typically, a frame includes several slices according to the size of a normal image, and thus if a slice error occurs, even information of other slices would be lost.

Most moving image coding systems use both a variable length coding method and a motion compensation coding method. If an error occurs even in a bit of a bit stream, a considerable part of video information may be lost and the influence of the damaged part continues through several subsequent frames. Thus, when a decoder decodes the bit stream transmitted through the above-mentioned coding process, serious picture quality deterioration may be caused.

In order to solve these problems, diverse error concealment techniques for restoring the decoded image nearly to the original image by complementing the lost information by using normally-restored adjacent information have been proposed.

Among many error concealment techniques, a spatial error concealment technique that performs an error concealment in a frame where an error has occurred and a temporal error concealment technique that conceals an error occurring in the present frame using video information of several frames are mainly used.

A general digital television (TV) receiver, as shown in FIG. 1, includes a channel decoder unit 10 for restoring digital data by performing an RF demodulation and a channel decoding of a received channel signal, a demultiplexer unit 20 for extracting a video signal, an audio signal and program information such as an electronic program guide by demultiplexing the digital data restored by the channel decoder unit 10, a video decoder unit 30 and an audio decoder unit 40 for decoding the video signal and the audio signal, respectively, a parser 50 for parsing the program information, an error concealment unit 60 for detecting an error occurring in the decoded video signal and concealing the detected error, a video output unit 70 for outputting the error-concealed video signal and the parsed program information, and an audio output unit 80 for outputting the decoded audio signal.

The error concealment unit 60, as illustrated in FIG. 2, includes an error detection unit 61 for detecting the error from the video signal decoded by the video decoder unit 30, a spatial error concealment unit 62 and a temporal error concealment unit 63 for performing an error concealment of the detected error through a spatial error concealment technique and a temporal error concealment technique according to the kind of the decided video signal.

Here, the error detection unit 61 may detect the error by judging whether a syntax of the bit stream decoded by the video decoder unit 30 is true or false, through the decoding error occurring while the channel decoder unit 10 decodes the received RF signal, or through a degree of incompatibility between a specified macro block and adjacent macro blocks in the video frame decoded by the video decoder unit 30.

The spatial error concealment unit 62, as illustrated in FIG. 3a, performs a spatial error concealment with respect to a macro block 91a where an error has occurred in the present video frame 91 by using adjacent macro blocks 91b, 91c and 91d. This spatial error concealment is mainly applied to a still image or an intracoded block. For example, the spatial error concealment unit 62 conceals the error by copying a normal macro block among the adjacent macro blocks 91b, 91c and 91d into the macro block 91a where the error has occurred.

On the other hand, the temporal error concealment unit 63 conceals the error using motion vectors in the previous frame that precedes the present frame. The temporal error concealment unit 63, as illustrated in FIG. 3b, performs the error concealment by copying a macro block 93a of the previous frame 93, which is in the same position as a macro block 92a where the error has occurred in the present frame 92, into the macro block 92a.

In order for the spatial error concealment unit 62 and the temporal error concealment unit 63 to perform the error concealment, a normal macro block should exist in the video frame that includes the macro block where the error has occurred, or in the previous video frame that precedes the video frame including the macro block where the error has occurred.

Accordingly, if the present video frame is seriously damaged and a normal macro block does not exist when the spatial error concealment unit 62 intends to conceal the error, or if a normal macro block does not exist in the previous frame when the temporal error concealment unit 63 intends to conceal the error, the error still remains in the video frame although the error has been concealed through the spatial error concealment unit 62 and the temporal error concealment unit 63, and it is difficult to provide a best-quality image to a user.

Korean Patent Unexamined Publication No. 2004-0089997 discloses a method of processing an error-occurring block in video data. According to this method, it is judged whether the difference of standard deviation between adjacent blocks exceeds a threshold value, and if the difference of standard deviation exceeds the threshold value, an error concealment process is performed while if the difference does not exceed the threshold value, the error concealment process is skipped. However, this method has the problem that it is difficult to perform the error concealment process if a normal macro block that is required for the error concealment process of the video data does not exist.

SUMMARY OF THE INVENTION

Accordingly, an aspect of the present invention is to provide an error concealment apparatus and method that can conceal errors occurring in video frames even if it is difficult to conceal the errors occurring in the video frames through a spatial error concealment technique and a temporal error concealment technique due to a very high error occurrence rate and a non-existence of a normal macro block.

Additional aspects of the invention will be set forth in part in the description which follows and in part will become apparent to those having ordinary skill in the art upon examination of the following or may be learned from practice of the invention.

In order to accomplish these aspects, there is provided an error concealment apparatus, according to exemplary embodiments of the present invention, which includes an error detection unit for detecting errors occurring in video frames; first and second error concealment units for concealing the detected errors; and a video output unit for selectively outputting the video frames of which the errors have been concealed by the first and second error concealment units according to the results of error detection.

In another aspect of the present invention, there is provided an error concealment method, which includes detecting errors occurring in video frames; concealing the detected errors by using at least one error concealment technique; and outputting the video frames of which the errors have been concealed by the corresponding error concealment technique according to the results of error detection.

BRIEF DESCRIPTION OF THE DRAWINGS

The above and other aspects of the present invention will be more apparent from the following detailed description taken in conjunction with the accompanying drawings, in which.

DETAILED DESCRIPTION OF EXEMPLARY EMBODIMENTS OF THE INVENTION

Figure 1:
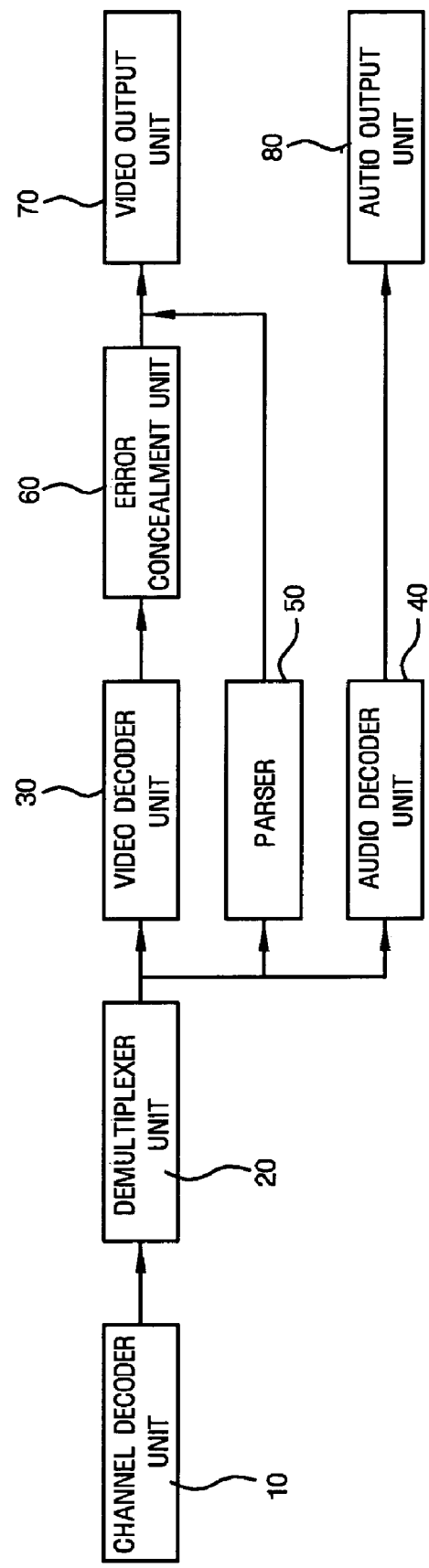
FIG. 1 is a block diagram illustrating the construction of a general digital TV receiver.
Figure 2:
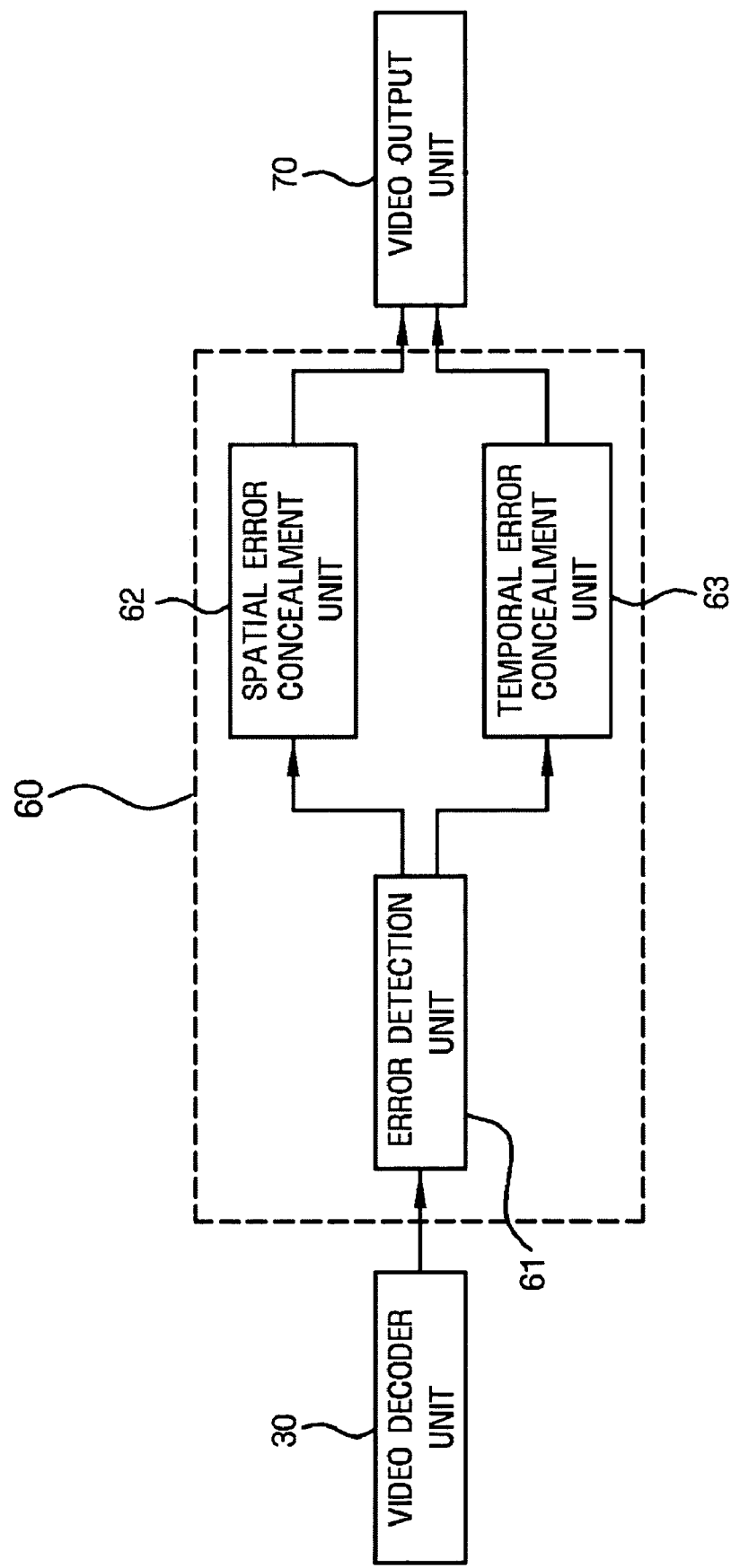
FIG. 2 is a block diagram illustrating the construction of an error concealment unit of FIG. 1.
Figure 3A:
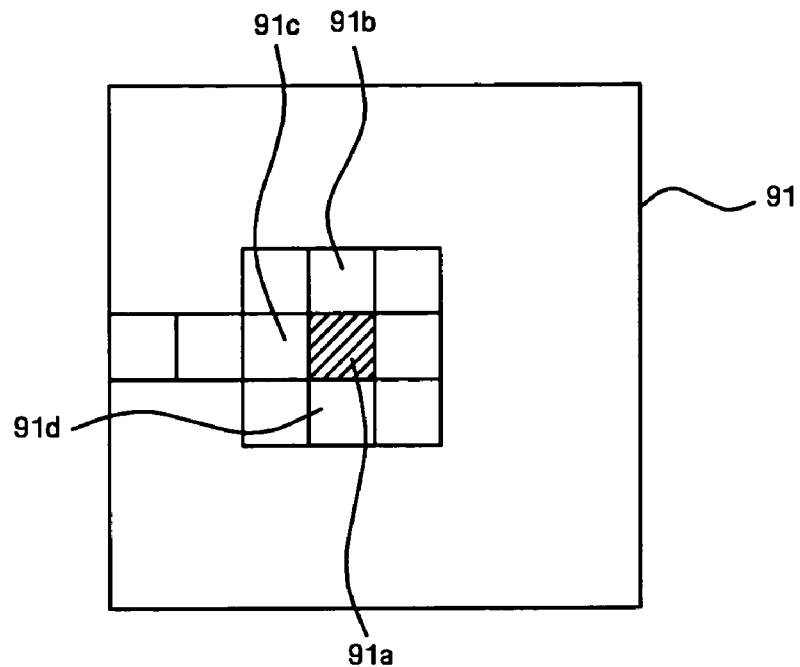
FIG. 3a is a view explaining a general spatial error concealment technique.
Figure 3B:
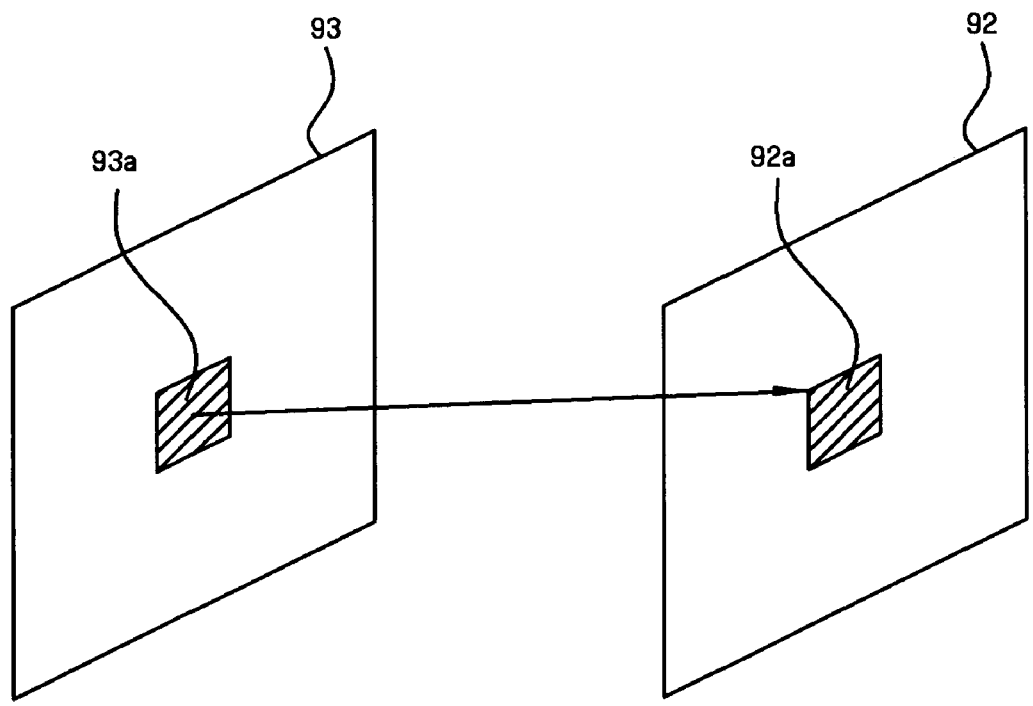
FIG. 3b is a view explaining a general temporal error concealment technique.

Hereinafter, exemplary embodiments of the present invention will be described in detail with reference to the accompanying drawings. The aspects of the present invention and methods for achieving the aspects will be apparent by referring to the exemplary embodiments to be described in detail with reference to the accompanying drawings. However, the present invention is not limited to the embodiments disclosed hereinafter, but will be implemented in diverse forms. The matters defined in the description, such as the detailed construction and elements, are nothing but specific details provided to assist those of ordinary skill in the art in a comprehensive understanding of the invention, and the present invention is only defined within the scope of appended claims. In the whole description of the present invention, the same drawing reference numerals are used for the same elements across various figures.

Generally, as techniques for detecting and concealing an error occurring in a macro block of a video frame, a spatial error concealment technique and a temporal error concealment technique have been used.

The spatial error concealment technique, if at least one of adjacent macro blocks, which are positioned on the upper, lower, right and left sides of a macro block of a video frame where an error has occurred, is a normal macro block, can copy the adjacent macro block on the upper, lower, right or left side of the macro block where the error has occurred, or perform a bilinear interpolation according to a pixel-to-pixel distance between the adjacent macro blocks.

Also, the temporal error concealment technique, if motion vectors of the macro blocks adjacent to the macro block where the error has occurred exist, can perform an interpolation by applying the motion vectors to the macro block where the error has occurred.

For reference, the motion vector means a displacement (e.g., horizontal and vertical displacement) between similar macro blocks of the video frames, and is an important index that indicates which macro block of the previous video frame is to be copied into the macro block of the present video frame where the error has occurred in the temporal error concealment technique. This motion vector is generally obtained through a luminance component, and the obtained motion vector is divided by 2 to be used as motion vectors for macro blocks of a chrominance signal.

The spatial error concealment technique and the temporal error concealment technique can perform an interpolation of the macro block where the error has occurred only in the case where a normal macro block exists. Accordingly, if the present video frame is seriously damaged and it is difficult to perform an interpolation using a normal macro block, a normal video frame cannot be obtained even after the interpolation through the spatial error concealment technique and the temporal error concealment technique is performed.

Figure 4:
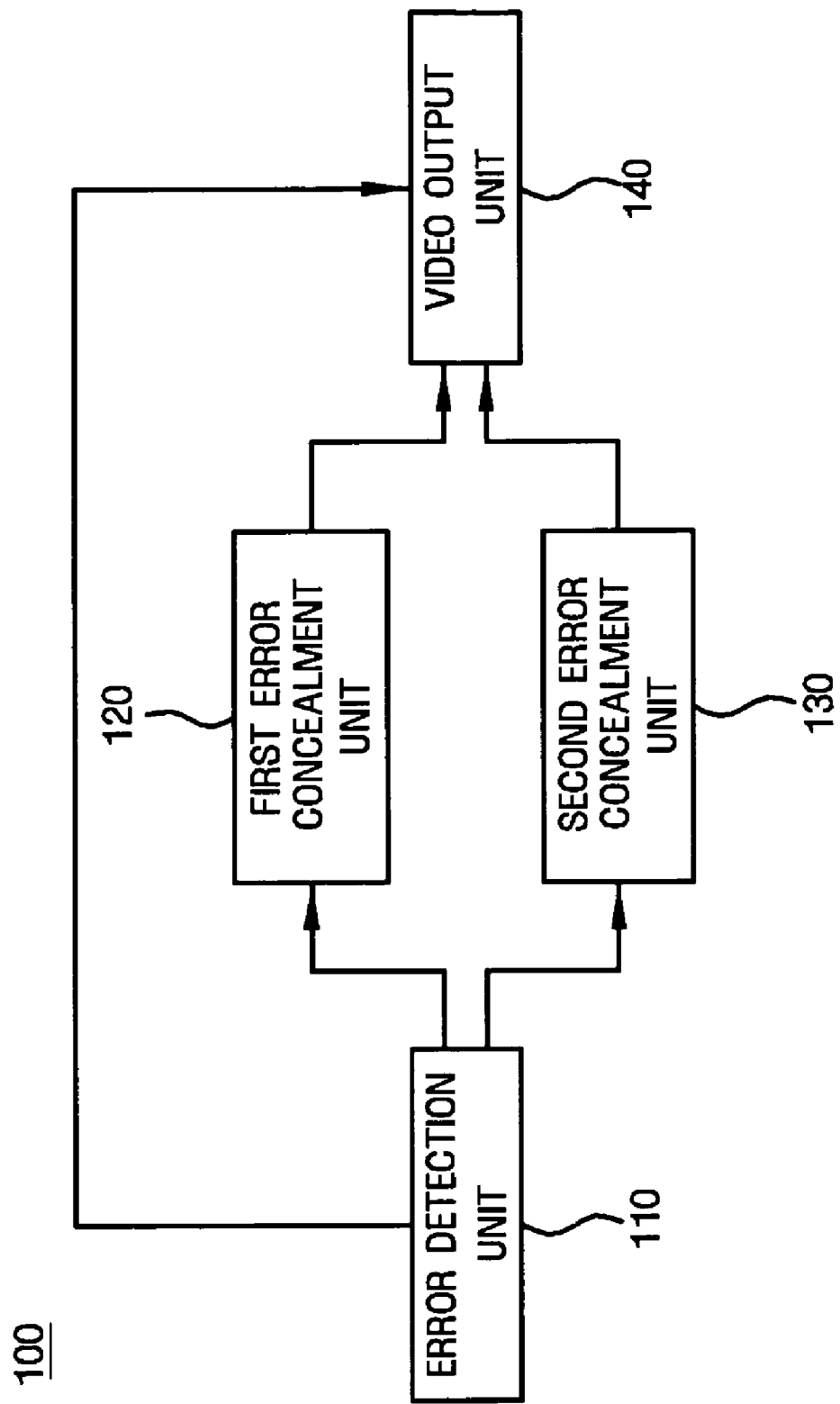
FIG. 4 is a block diagram illustrating the construction of an error concealment apparatus according to an exemplary embodiment of the present invention.

The present invention provides an error concealment apparatus that can conceal an error even if a normal video frame cannot be obtained by performing an interpolation using the spatial error concealment technique and the temporal error concealment technique. FIG. 4 is a block diagram illustrating the construction of an error concealment apparatus according to an exemplary embodiment of the present invention.

As illustrated in FIG. 4, the error concealment apparatus 100 according to an exemplary embodiment of the present invention includes an error detection unit 110 for detecting an error occurring in a video frame, first and second error concealment units 120 and 130 for performing an error concealment according to the results of error detection, and a video output unit 140 for selectively outputting the error-concealed video frame of which the error has been concealed by the first and second error concealment units 120 and 130 according to the results of error detection.

A video frame is composed of many macro blocks, and the error detection unit 110 can detect whether the error has occurred through the degree of incompatibility between a specified block and an adjacent macro block. For example, if the difference between the specified macro block and the adjacent macro block in brightness, contrast, color, and others, is abruptly changed, it can be judged that the incompatibility between the macro blocks occurs due to an error occurrence in the corresponding macro block.

In addition, the error detection unit 110 counts the macro blocks where the error occurs in the video frame, and compares the counted value with a predetermined counted value.

Hereinafter, the predetermined counted value is called a "first counted value", and the value counted by the error detection unit 110 is called a "second counted value". The results of comparing the first counted value with the second counted value may be used as the basis of selecting the video frame to be outputted from the video output unit 140.

The first error concealment unit 120 can conceal the error occurring in the video frame through the existing error concealment technique. For example, the first error concealment unit 120 conceals the error occurring in the video frame through the above-described spatial error concealment technique or temporal error concealment technique.

The second error concealment unit 130 can conceal the error by removing the video frame where the error has occurred and reconstructing the video frame where the error has occurred through the preceding and following video frames of the removed video frame. For example, if errors occur in two successive video frames, the second error concealment unit 130 removes the two video frames where the errors have occurred, and reconstructs the two removed video frames through motion vectors between the preceding video frame and the following video frame of the removed video frame. If the error still exists in the video frame although the error has been concealed through the spatial error concealment technique or the temporal error concealment technique, the second error concealment unit 130 removes and reconstructs the video frame where the error occurred, and thus it can conceal the error of the video frame that is difficult to be concealed by the existing error concealment techniques.

The video output unit 140 can selectively output the video frame of which the error has been concealed by the first and second error concealment units 120 and 130 according to the results of comparison by the error detection unit 110. In other words, if the second value counted by the error detection unit 110 is smaller than the first counted value, the first error concealment unit 120 outputs the error-concealed video frame, while otherwise, the second error concealment unit 130 outputs the error-concealed video frame.

Specifically, if the second counted value is larger than the first counted value, this means that the number of macro blocks where errors have occurred in the video frame exceeds the first counted value that is the reference value, and it is difficult to obtain a normal video frame by the error concealment through the existing spatial error concealment technique or temporal error concealment technique. On the other hand, if the second counted value is smaller than the first counted value, this means that the number of macro blocks where errors have occurred in the video frame is smaller than the first counted value, and thus the error can be sufficiently concealed by the existing spatial error concealment technique or temporal error concealment technique.

The operation of the error concealment apparatus as constructed above according to an exemplary embodiment of the present invention will now be explained.

Figure 5:
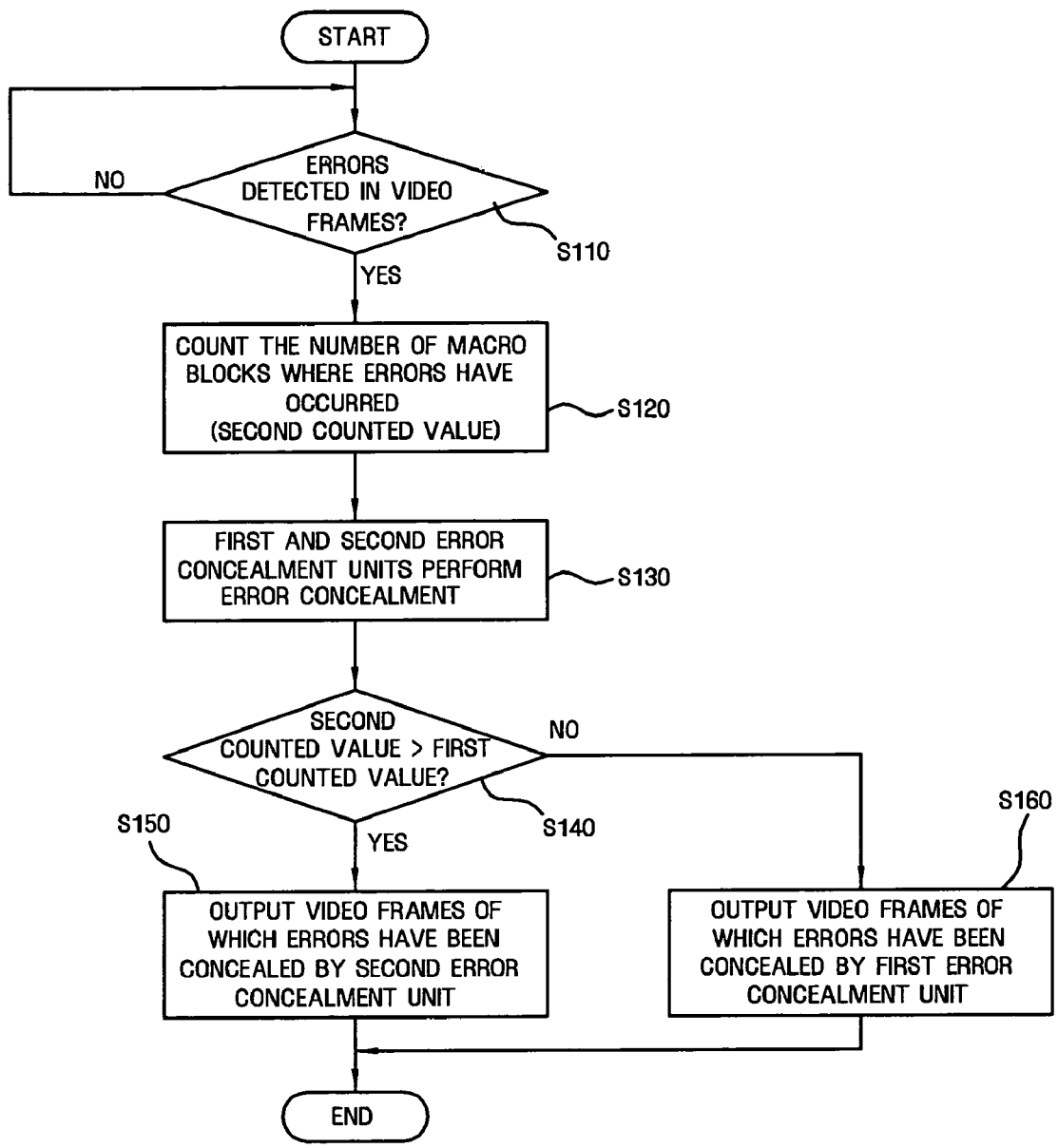
FIG. 5 is a flowchart illustrating an error concealment method according to an exemplary embodiment of the present invention.

FIG. 5 is a flowchart illustrating an error concealment method according to an exemplary embodiment of the present invention.

As illustrated in FIG. 5, if the error detection unit 110 detects an error in a video frame S110, it counts the number of macro blocks where errors have occurred S120. At this time, the counted number of macro blocks may be understood as the second counted value as described above.

Also, if an error is detected, the first and second error concealment units 120 and 130 respectively perform the concealment of the detected error using the corresponding error concealment techniques S130. That is, if an error is detected, the first error concealment unit 120 performs the error concealment through the spatial or temporal error concealment technique, and the second error concealment unit 130 removes the video frame where the error has occurred and reconstructs the removed video frame to perform the error concealment.

In this case, the size I of a respective pixel of the video frame reconstructed by the second error concealment unit 130 is obtained by Equation (1).

$$I(p,t+\tau)=w*I(p-\tau*mv,t)+(1-w)*I(p+(1-\tau)*mv,t+1) \quad (1)$$

In Equation (1), I(p, t) denotes the size of a pixel in position p at time t, mv denotes a motion vector calculated from the preceding and following video frames of the removed video frame, τ denotes a scale range of the video frame reconstructed by the second error concealment unit 130, w denotes a weight value of the preceding and following video frames that is referred to when the removed video frame is reconstructed.

Specifically, the size of a pixel of the video frame that is presently be reconstructed by the second error concealment unit 130 is indicated as I(p, t+τ), and τ may have a value between 0 and 1. In this case, the video frame having 0 and 1 as the value of τ may be allocated to the preceding and following video frames of the video frame removed by the second error concealment unit 130 in a specified order. For example, if errors which occurred in the second and third video frames among four video frames are removed, τ of the first video frame may be allocated with 0 and τ of the last video frame may be allocated with 1. In this case, ⅓ and ⅔ may allocated as τ of the second and third video frames, respectively. By contrast, τ of the last video frame may be allocated with 0 and τ of the first video frame may be allocated with 1. In this case, ⅓ and ⅔ may allocated as τ of the third and second video frames, respectively. In other words, τ may be understood as a rate of time intervals between video frames that are referred to when the removed video frames are reconstructed.

In an exemplary embodiment of the present invention, it is exemplified that τ of the first video frame is set to 0, τ of the last video frame is set to 1, and τ of the second and third video frames are set to ⅓ and ⅔, respectively.

Figure 6:
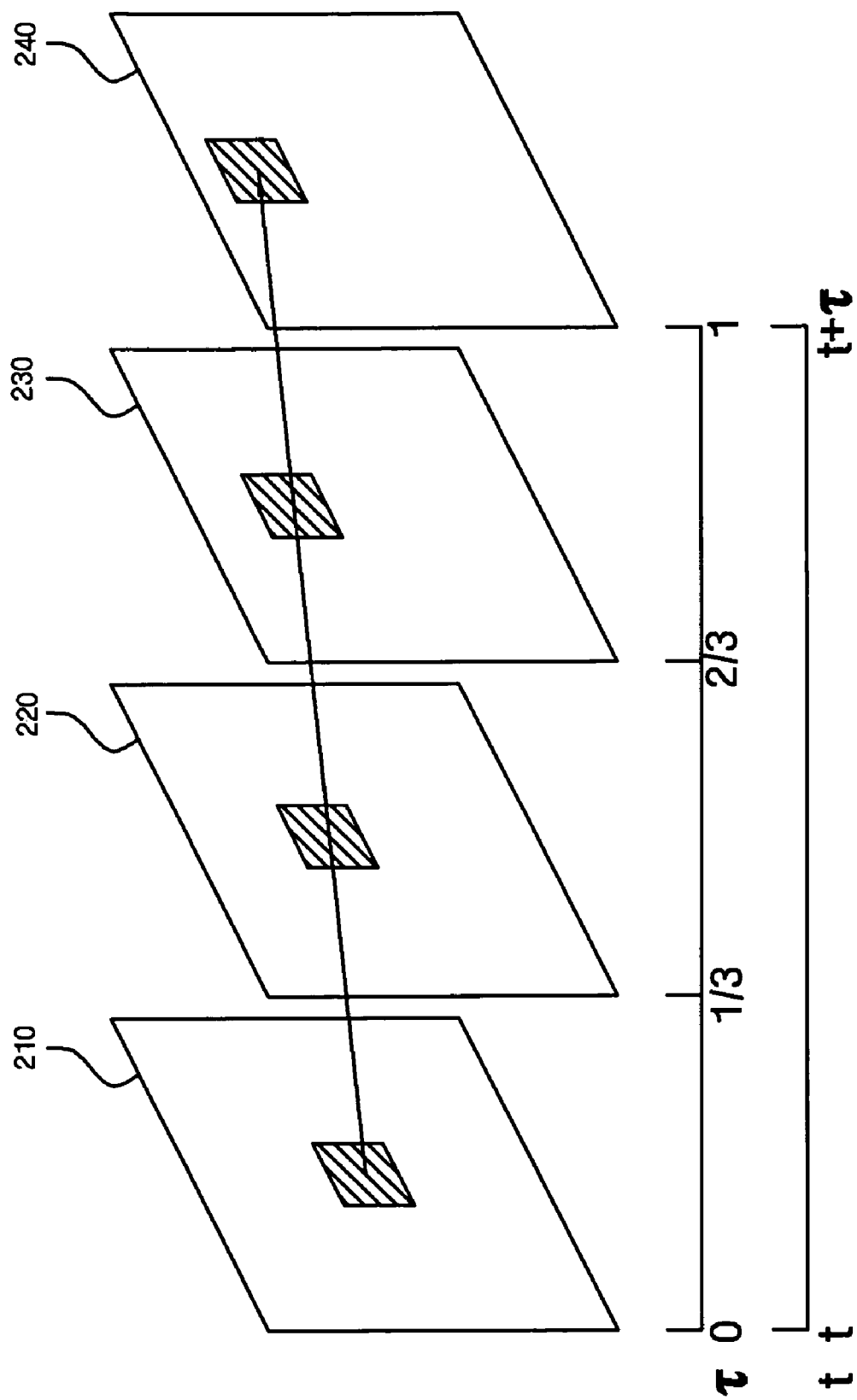
FIG. 6 is a view explaining an error concealment process performed by a second error concealment unit according to an exemplary embodiment of the present invention.

As illustrated in FIG. 6, in the case of reconstructing the second video frame 220 where an error has occurred, Equation (1) may be expressed as $$I(p,t+⅓)=w*I(p-⅓)*mv,t)+(1-w)*I(p+⅔*mv,t+1).$$

Here, w denotes a weight value respectively given to the first video frame 210 and the last video frame 240 when the second video frame 220 is reconstructed. According to this weight value, the rate of video frame components to be included in the reconstructed video frame is determined when the second video frame 220 is reconstructed. For example, if w is ½, the components of the first video frame 210 and the last video frame 240 are equally included in the reconstructed video frame, and if w=τ, the weight value is varied according to the time difference between the reconstructed video frame and the referred video frame, and thus a gradation effect of video frames is produced. The third video frame 230 can be reconstructed in a similar manner to the process of reconstructing the second video frame 220 as described above.

Specifically, in the case of reconstructing the third video frame 230 where an error has occurred, Equation (1) may be expressed as $$I(p,t+2/3)=w*I(p-2/3)*\mathrm{mv},t)+(1-\tau)*I(p+1/3*\mathrm{mv},t+1).$$

Thereafter, the error detection unit 110 compares the number of macro blocks where errors have occurred with the predetermined first counted value S140. That is, the error detection unit 110 judges the size of the second counted value by comparing the second counted value with the first counted value so that it can select the video frame to be outputted from the video output unit 140.

If the second counted value is larger than the first counted value as the result of comparison by the error detection unit 110, the video output unit 140 outputs the video frame of which the error has been concealed by the second error concealment unit 130 S150.

By contrast, if the second counted value is smaller than the first counted value as the result of comparison by the error detection unit 110, the video output unit 140 outputs the video frame of which the error has been concealed by the first error concealment unit 120 S160.

As described above, the video output unit 140 selectively uses the error concealment techniques according to the number of macro blocks where errors have occurred. Accordingly, if a serious error occurs in the video frame and it is difficult to conceal the error through the existing spatial error concealment technique or temporal error concealment technique, the video output unit selects and outputs the video frame of which the error has been concealed by the second error concealment unit 130, and thus a best-quality image can be provided to the user.

Figure 8:
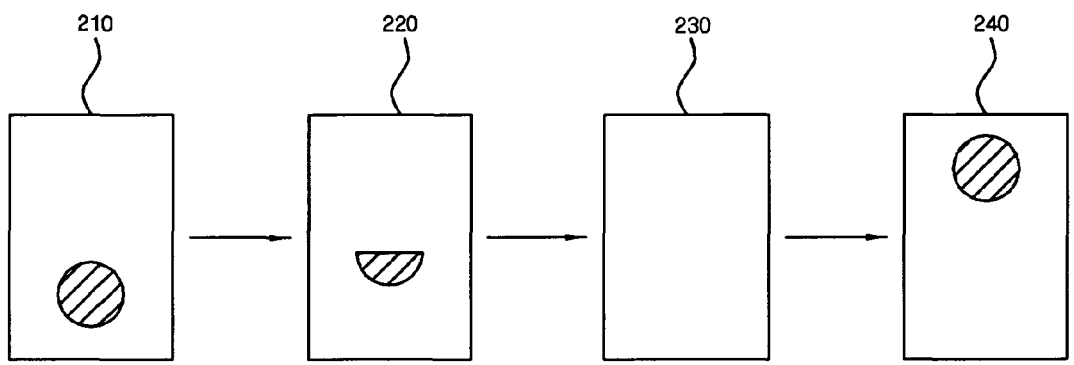
FIG. 8 is a view illustrating a video frame of which an error is concealed by a first error concealment unit according to an exemplary embodiment of the present invention.
Figure 9:
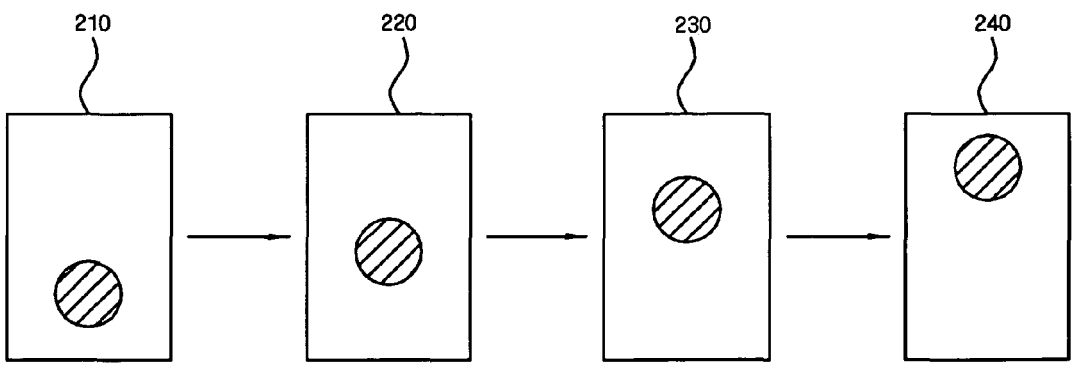
FIG. 9 is a view illustrating a video frame of which an error is concealed by a second error concealment unit according to an exemplary embodiment of the present invention.

The error concealment process performed by the error concealment method as described above will be explained in more detail with reference to FIGS. 7 to 9. In an exemplary embodiment of the present invention, it is exemplified that errors have occurred in four successive video frames.

Figure 7:
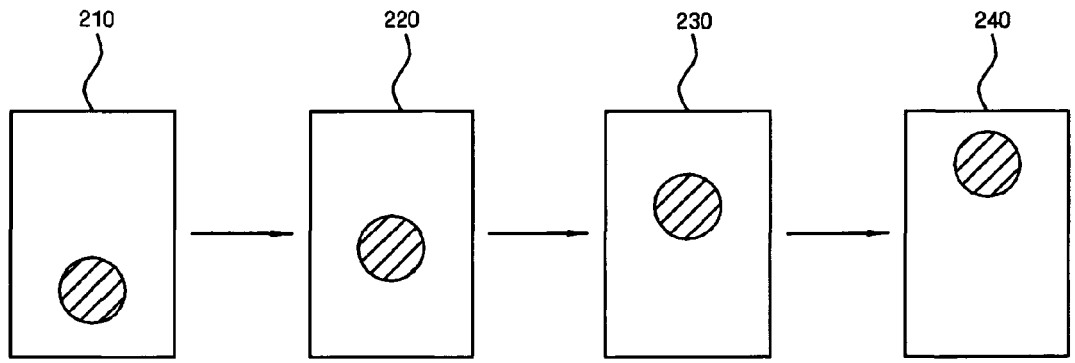
FIG. 7 is a view illustrating a normal video frame according to an exemplary embodiment of the present invention.

In FIG. 7, first to fourth video frames 210, 220, 230 and 240 are illustrated as normal video frames. In an exemplary embodiment of the present invention, it is exemplified that errors have occurred in two video frames among four video frames. However, the present invention is not limited thereto.

In the case where errors have occurred in the second and third video frames 220 and 230 as illustrated in FIG. 7, the error detection unit 110 of the error concealment apparatus 110 according to an exemplary embodiment of the present invention detects the generated errors, and compares the second counted value obtained by counting the macro blocks where errors have occurred with the first counted value.

Then, the first and second error concealment units 120 and 130 perform the error concealment of the second and third video frames 220 and 230. In an exemplary embodiment of the present invention, it is exemplified that the second counted value is larger than the first counted value, i.e., it is difficult to conceal the errors through the existing spatial error concealment technique or temporal error concealment technique.

If the second counted value is larger than the first counted value as described above, the error occurrence rate of the video frames become very high in concealing the errors using the existing spatial error concealment technique or temporal error concealment technique. Specifically, in the case of concealing the errors through the first error concealment unit 120, as illustrated in FIG. 8, the errors occurring in the second and third video frames 220 and 230 are not completely concealed, and thus normal video frames do not appear.

On the other hand, the second error concealment unit 130 removes the second and third video frames where the errors have occurred, and reconstructs the second and third video frames by referring to the motion vector between the first video frame 210 and the fourth video frame 240. Accordingly, as illustrated in FIG. 9, the errors occurring in the normal video frames as illustrated in FIG. 6 can be concealed, and thus a best-quality image can be provided to the user.

In an exemplary embodiment of the present invention, if the error detection unit 110 detects errors, the first and second error concealment units 120 and 130 may simultaneously or selectively perform the error concealment according to the results of comparison by the error detection unit 110.

As described above, according to the error concealment apparatus and method according to exemplary embodiments of the present invention, the error concealment can be performed with respect to video frames having an error occurrence rate so high that it is difficult to conceal the error using the spatial error concealment technique or temporal error concealment technique.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An error concealment apparatus comprising:
   an error detection unit which detects errors occurring in video frames;
   first and second error concealment units which conceal the detected errors and output video frames of which the errors have been concealed; and
   a video output unit which selectively outputs one of video frames of which the errors have been concealed by the first error concealment unit and video frames of which the errors have been concealed by the second error concealment unit according to the results of error detection;
   wherein the error detection unit compares a counted value of macro blocks where the errors have occurred in the video frames with a predetermined counted value.

2. The error concealment apparatus as claimed in claim 1, wherein the first error concealment unit uses at least one of a spatial error concealment technique and a temporal error concealment technique.

3. The error concealment apparatus as claimed in claim 2, wherein the second error concealment unit removes the video frames where the errors have occurred, and reconstructs the removed video frames through motion vectors between a preceding video frame and a following video frame of the removed video frames.

4. The error concealment apparatus as claimed in claim 3, wherein a pixel size I of the video frame reconstructed by the second error concealment unit is obtained by $$I(p,t+\tau)=w*I(p-\tau*\mathrm{mv},t)+(1-w)*I(p+(1-\tau)*\mathrm{mv},t+1)$$

where, I(p, t) denotes a size of a pixel in position p at time t, mv denotes a motion vector calculated from the preceding video frame and the following video frame of the removed video frame, τ denotes a scale range of the video frame reconstructed by the second error concealment unit, and w denotes a weight value of the preceding video frame and the following video frame that is referred to when the removed video frames are reconstructed.

5. The error concealment apparatus as claimed in claim 4, wherein the video output unit outputs the video frames of which the errors have been concealed by the second error concealment unit only when the counted value of the macro blocks where the errors have occurred in the video frames is larger than the predetermined counted value.

6. The error concealment apparatus as claimed in claim 1, wherein the video output unit outputs the video frames of which the errors have been concealed by the second error concealment unit only when the counted value of the macro blocks where the errors have occurred in the video frames is larger than the predetermined counted value.

7. The error concealment apparatus as claimed in claim 1, wherein the first error concealment unit uses at least one of a spatial error concealment technique and a temporal error concealment technique.

8. The error concealment apparatus as claimed in claim 1, wherein the second error concealment unit removes the video frames where the errors have occurred, and reconstructs the removed video frames through motion vectors between a preceding video frame and a following video frame of the removed video frames.

9. An error concealment method comprising:
    detecting errors occurring in video frames;
    concealing the detected errors by using at least a first error concealment technique and a second error concealment technique; and
    outputting video frames of which the errors have been concealed by one of the first error concealment technique and the second error concealment technique according to the results of error detection;
    wherein the detecting the errors comprises comparing a counted value of macro blocks where the errors have occurred in the video frames with a predetermined counted value.

10. The error concealment method as claimed in claim 9, wherein the at least one error concealment technique includes at least one of a spatial error concealment technique, a temporal error concealment technique, and an error concealment technique for removing the video frames where the errors have occurred and reconstructing the removed video frames through motion vectors between a preceding video frame and a following video frame of the removed video frames.

11. The error concealment method as claimed in claim 10, wherein a pixel size I of the reconstructed video frame is obtained by $$I(p,t+\tau)=w*I(p-\tau*\mathrm{mv},t)+(1-w)*I(p+(1-\tau)*\mathrm{mv},t+1)$$

where, I(p, t) denotes a size of a pixel in position p at time t, mv denotes a motion vector calculated from the preceding video frame and the following video frame of the removed video frame, τ denotes a scale range of the reconstructed video frame, and w denotes a weight value of the preceding video frame and the following video frame that is referred to when the removed video frames are reconstructed.

12. The error concealment method as claimed in claim 11, wherein the outputting the video frames comprises:
    receiving the result of comparison of the counted value of the macro blocks where the errors have occurred in the video frames with the predetermined counted value; and
    outputting the video frames of which the errors have been concealed by the error concealment technique, which removes the video frames where the errors have occurred and reconstructs the removed video frames through motion vectors between the preceding video frame and the following video frame of the removed video frames, only when the counted value of the macro blocks where the errors have occurred in the video frames is larger than the predetermined counted value as the result of comparison.

13. The error concealment method as claimed in claim 9, wherein the at least one error concealment technique includes at least one of a spatial error concealment technique, a temporal error concealment technique, and an error concealment technique for removing the video frames where the errors have occurred and reconstructing the removed video frames through motion vectors between a preceding video frame and a following video frame of the removed video frames.

14. The error concealment method as claimed in claim 9, wherein the outputting the video frames comprises:
    receiving the result of comparison of the counted value of the macro blocks where the errors have occurred in the video frames with the predetermined counted value; and
    outputting the video frames of which the errors have been concealed by the error concealment technique, which removes the video frames where the errors have occurred and reconstructs the removed video frames through motion vectors between a preceding video frame and a following video frame of the removed video frames, only when the counted value of the macro blocks where the errors have occurred in the video frames is larger than the predetermined counted value as the result of comparison.

* * * * *